US012721490B2

(12) United States Patent
Beining et al.

(10) Patent No.: US 12,721,490 B2
(45) Date of Patent: Sep. 1, 2026

(54) STATIC DISCHARGE MITIGATION OF VACUUM CLEANERS

(71) Applicant: MILWAUKEE ELECTRIC TOOL CORPORATION, Brookfield, WI (US)

(72) Inventors: Nathan Beining, Milwaukee, WI (US); Brian Cornell, West Allis, WI (US); Srdjan Acimovic, Hales Corners, WI (US); Anthony R. Sleck, Lisbon, WI (US); Randolph H. McHugh, Sullivan, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 438 days.

(21) Appl. No.: 18/171,782

(22) Filed: Feb. 21, 2023

(65) Prior Publication Data

US 2023/0263353 A1 Aug. 24, 2023

Related U.S. Application Data

(60) Provisional application No. 63/319,081, filed on Mar. 11, 2022, provisional application No. 63/313,613, filed on Feb. 24, 2022.

(51) Int. Cl.
*A47L 9/24* (2006.01)
*A47L 5/36* (2006.01)
(Continued)

(52) U.S. Cl.
CPC ............... *A47L 9/248* (2013.01); *A47L 5/365* (2013.01); *A47L 9/22* (2013.01); *A47L 9/2884* (2013.01); *H05F 1/02* (2013.01); *F16L 11/15* (2013.01)

(58) Field of Classification Search
CPC ................................ A47L 9/248; A47L 5/365
See application file for complete search history.

(56) References Cited

U.S. PATENT DOCUMENTS 4,697,300 A * 10/1987 Warlop ................. A47L 9/2889 361/215
4,866,565 A * 9/1989 Wray, Jr. ................... H05F 3/02 361/220

(Continued)

FOREIGN PATENT DOCUMENTS

CN 1309946 A * 8/2001 ............... A47L 9/24
CN 101953661 A 1/2011

(Continued)

OTHER PUBLICATIONS

RTP Co.—Polypropylene (PP) with Glass Fiber and ESD protection—Jan. 4, 2017 (Year: 2017).*

(Continued)

*Primary Examiner* — Marc Carlson
(74) *Attorney, Agent, or Firm* — Michael Best & Friedrich LLP

(57) ABSTRACT

A vacuum cleaner system comprising a motor-impeller assembly, a power source, and a hose. The motor-impeller assembly is configured to generate fluid flow, the fluid flow passing through a hose inlet. The power source is configured to supply power to the motor-impeller assembly. The hose includes a proximal hose end configured to be coupled to the hose inlet, a distal hose end spaced from the proximal hose end, and a hose body. The hose body is coupled to the proximal hose end and the distal hose end. The hose body has an inner surface through which fluid flow passes, and an outer surface open to the surroundings of the hose. The hose further includes a layer of anti-static material applied to either the inner surface of the hose body or the outer surface of the hose body.

8 Claims, 9 Drawing Sheets

(51) Int. Cl.

| | |
|---|---|
| ***A47L 9/22*** | (2006.01) |
| ***A47L 9/28*** | (2006.01) |
| ***H05F 1/02*** | (2006.01) |
| *F16L 11/15* | (2006.01) |

(56) References Cited

U.S. PATENT DOCUMENTS 4,912,593 A * 3/1990 Iwao .................... A47L 9/2857 361/220
5,150,499 A * 9/1992 Berfield .................... A47L 9/24 361/220
5,855,036 A * 1/1999 Krock .................... H05F 3/02 15/420
5,933,914 A * 8/1999 Beane .................... A47L 9/14 15/246.2
9,526,386 B2 * 12/2016 Roth .................... H02J 7/345
9,680,355 B2 * 6/2017 Harvey .................... H02K 5/225
2003/0226232 A1 * 12/2003 Hayashi .................... B04C 9/00 15/353
2010/0242209 A1 9/2010 Beskow et al.
2011/0113587 A1 * 5/2011 Nagasaka .................... A47L 5/36 15/339
2013/0255030 A1 * 10/2013 Meredith .................... A47L 7/0004 15/347
2017/0347849 A1 * 12/2017 Majer .................... A47L 7/0095
2018/0119848 A1 * 5/2018 Nishino .................... B29C 70/74
2018/0199785 A1 * 7/2018 Farmer .................... A47L 9/068
2019/0029487 A1 * 1/2019 Zhou .................... A47L 9/2884
2019/0159643 A1 * 5/2019 Machida .................... A47L 9/2857
2020/0297177 A1 * 9/2020 Zhu .................... A47L 9/28
2021/0393096 A1 * 12/2021 Maier .................... A47L 9/242
2021/0401253 A1 * 12/2021 Ni .................... A47L 9/248
2022/0079405 A1 * 3/2022 Yang .................... A47L 9/2889
2022/0167817 A1 * 6/2022 Hong .................... A47L 9/02
2023/0233044 A1 * 7/2023 Kousaka .................... A47L 5/26 15/339
2023/0371771 A1 * 11/2023 Wang .................... A47L 9/22

FOREIGN PATENT DOCUMENTS

CN 202288137 U * 7/2012 .................... A47L 9/327
CN 109549566 A * 4/2019 .................... A47L 9/248
CN 110996736 A * 4/2020 .................... A47L 9/248
CN 111012246 A * 4/2020 .................... A47L 9/24
CN 111419114 A * 7/2020 .................... A47L 9/00
CN 113180536 A 7/2021
CN 116058722 A * 5/2023 .................... A47L 9/24
CN 221383421 U * 7/2024
DE 69102675 T2 12/1994
DE 102011007204 A1 10/2012
DE 102011084196 A1 * 4/2013 .................... A47L 9/248
DE 102018219285 A1 * 5/2020 .................... F16L 27/0812
DE 102019105086 A1 9/2020
DE 102021207952 A1 2/2022
DE 102021002202 A1 * 10/2022 .................... A47L 9/242
EP 2772174 A2 * 9/2014 .................... A47L 9/242
GB 2472070 A * 1/2011 .................... F16L 11/02
JP S63286122 A * 11/1988
JP H01259825 A * 10/1989
JP H03295526 A * 12/1991
JP 2001161612 A * 6/2001 .................... A47L 5/362
JP 2001204666 A * 7/2001 .................... A47L 5/14
JP 2005278900 A 10/2005
JP 2007061128 A 3/2007
JP 2009100840 A 5/2009
JP 2011041619 A 3/2011
JP 3183535 U 5/2013
KR 100698254 B1 * 3/2007 .................... A47L 9/1683
KR 20200016856 A * 2/2020 .................... B25F 5/00
WO WO-2015087367 A1 * 6/2015 .................... A47L 9/248
WO WO-2016097102 A1 * 6/2016 .................... A47L 9/242
WO WO-2019010872 A1 * 1/2019 .................... H05F 3/00
WO WO-2019179874 A1 * 9/2019 .................... A47L 9/242
WO WO-2023007001 A1 * 2/2023 .................... H01R 13/005

OTHER PUBLICATIONS

Reichelt Chemietechnik GmbH + Co., “PP—Polypropylene (Hostalen® PP),” <https://web.archive.org/web/20201022005116/https://www.rct-online.de/de/RctGlossar/detail/id/18> web page available as early as Oct. 22, 2020 (12 pages).

Translation of German Patent Office Action for Application No. 102023104620.9 dated Aug. 14, 2024 (7 pages).

* cited by examiner

STATIC DISCHARGE MITIGATION OF VACUUM CLEANERS

RELATED APPLICATIONS

This application claims the benefit of prior-filed, U.S. Provisional Application No. 63/319,081, filed Mar. 11, 2022, and prior-filed, U.S. Provisional Application No. 63/313,613, filed Feb. 24, 2022, the entire contents of which are hereby incorporated by reference.

FIELD OF THE INVENTION

The present invention relates to a vacuum cleaners, and more particularly to vacuum cleaners and vacuum cleaner systems having static discharge mitigation features.

BACKGROUND OF THE INVENTION

There are various power tools and vacuum cleaners known in the art that accumulate static charge while in use, which can be discharged to an operator. Vacuum cleaners may accumulate a static electrical charge through repeated contact between various components of the vacuum with vacuumed debris and/or fluid. Charged debris and/or fluid may accumulate on various components vacuum cleaner. Upon reaching a high enough level, static electricity may be discharged either to the user as a shock or to the tool electronics.

SUMMARY OF THE INVENTION

The present invention provides, in one aspect, a vacuum cleaner system comprising a motor-impeller assembly, a power source, and a hose. The motor-impeller assembly is configured to generate fluid flow, the fluid flow passing through a hose inlet. The power source is configured to supply power to the motor-impeller assembly. The hose includes a proximal hose end configured to be coupled to the hose inlet, a distal hose end spaced from the proximal hose end, and a hose body. The hose body is coupled to the proximal hose end and the distal hose end. The hose body has an inner surface through which fluid flow passes, and an outer surface open to the surroundings of the hose. The hose further includes a layer of anti-static material applied to either the inner surface of the hose body or the outer surface of the hose body.

The present invention provides, in another aspect, a vacuum cleaner comprising a midframe, a motor-impeller assembly, a power source, a volute, and a motor isolator. The motor-impeller assembly is configured to generate fluid flow. The motor-impeller assembly is supported by the midframe. The power source is configured to supply power to the motor-impeller assembly. The volute surrounds at least a portion of the motor-impeller assembly. The motor isolator is positioned between the motor-impeller assembly and the volute. The motor isolator comprises an anti-static material configured to isolate static charge of the volute from the motor-impeller assembly.

The present invention provides, in another aspect, a vacuum cleaner comprising a motor-impeller assembly and an exhaust tube. The motor-impeller assembly is configured to generate fluid flow extending from a hose inlet and out a blower port of the vacuum cleaner. The exhaust tube is positioned in fluid communication with and between the motor-impeller assembly and the blower port. The exhaust tube comprises an anti-static material.

The present invention provides, in another aspect, a vacuum cleaner comprising a head, a motor-impeller assembly, and battery box foam. The head includes a plurality of exhaust slits and a battery box. The battery box is configured to receive a battery pack. The motor-impeller assembly is configured to generate fluid flow and is configured to be electrically coupled to the battery pack via the battery box. The battery box foam is positioned on the exhaust slits adjacent to the battery box. The battery box foam has anti-static material properties.

Independent features and independent advantages of the invention will become apparent to those skilled in the art upon review of the detailed description, drawings and claims.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
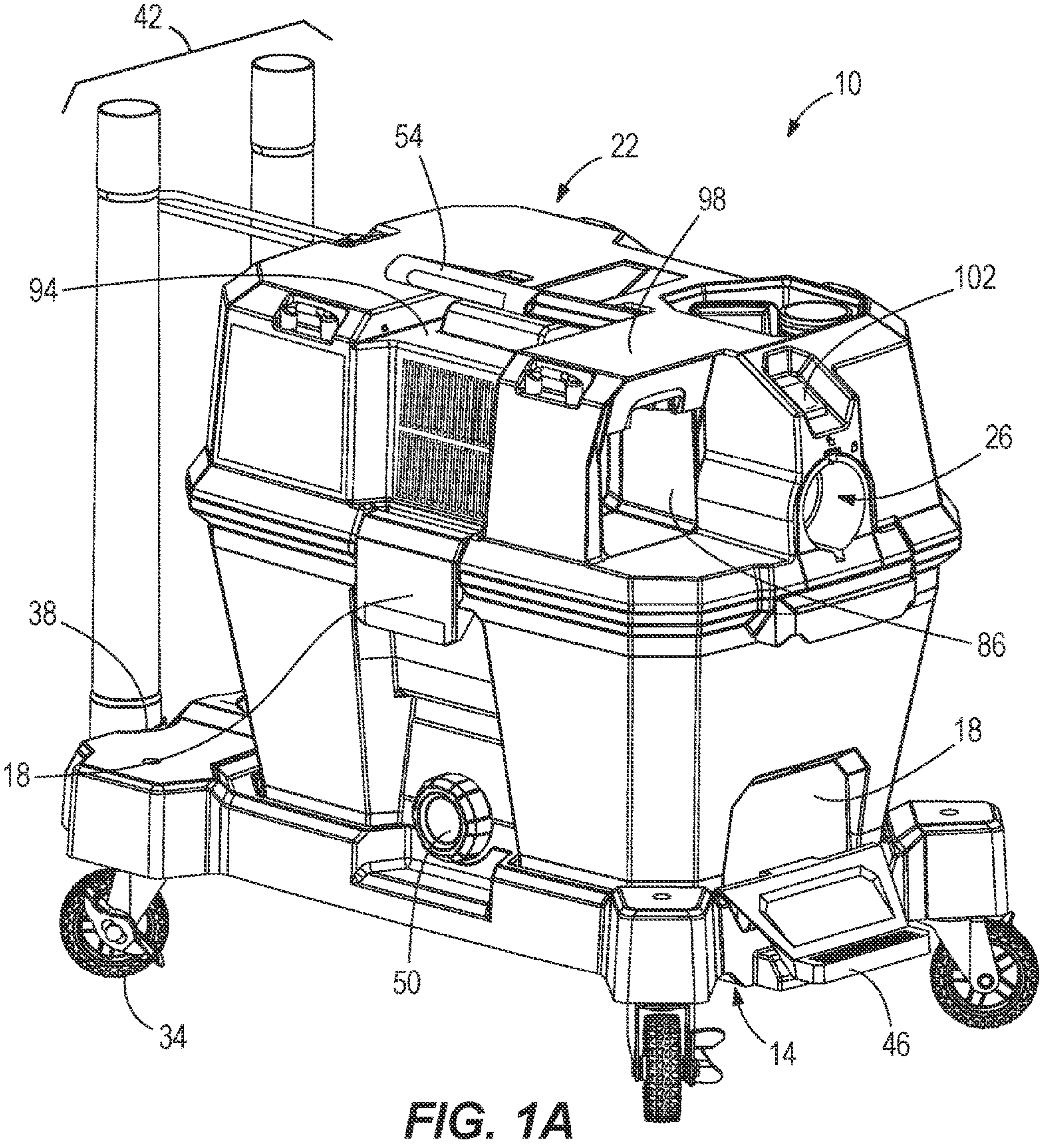
FIG. 1A is perspective view of a vacuum cleaner.
Figure 1B:
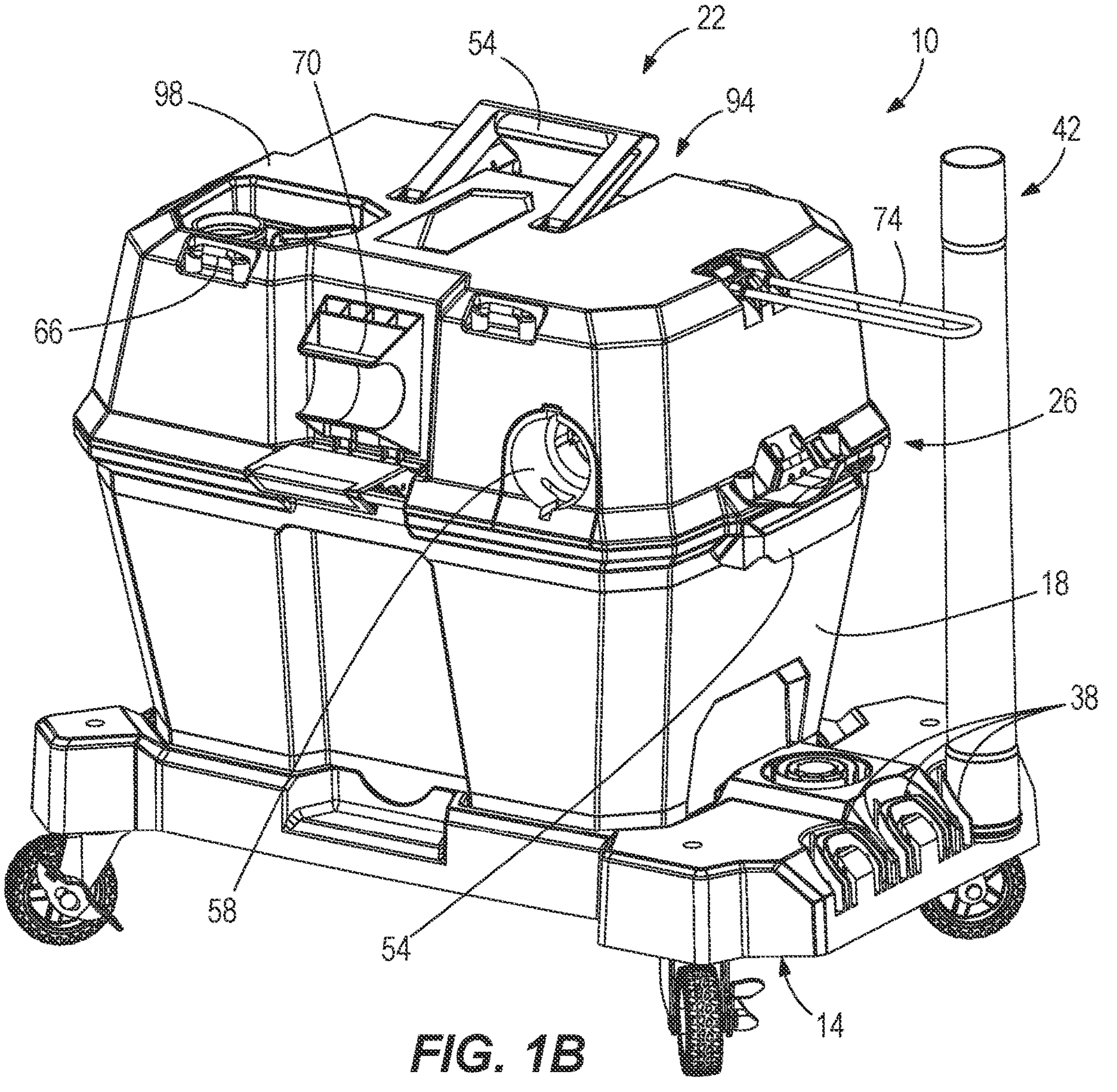
FIG. 1B is another perspective view of the vacuum cleaner of FIG. 1A.
Figure 3:
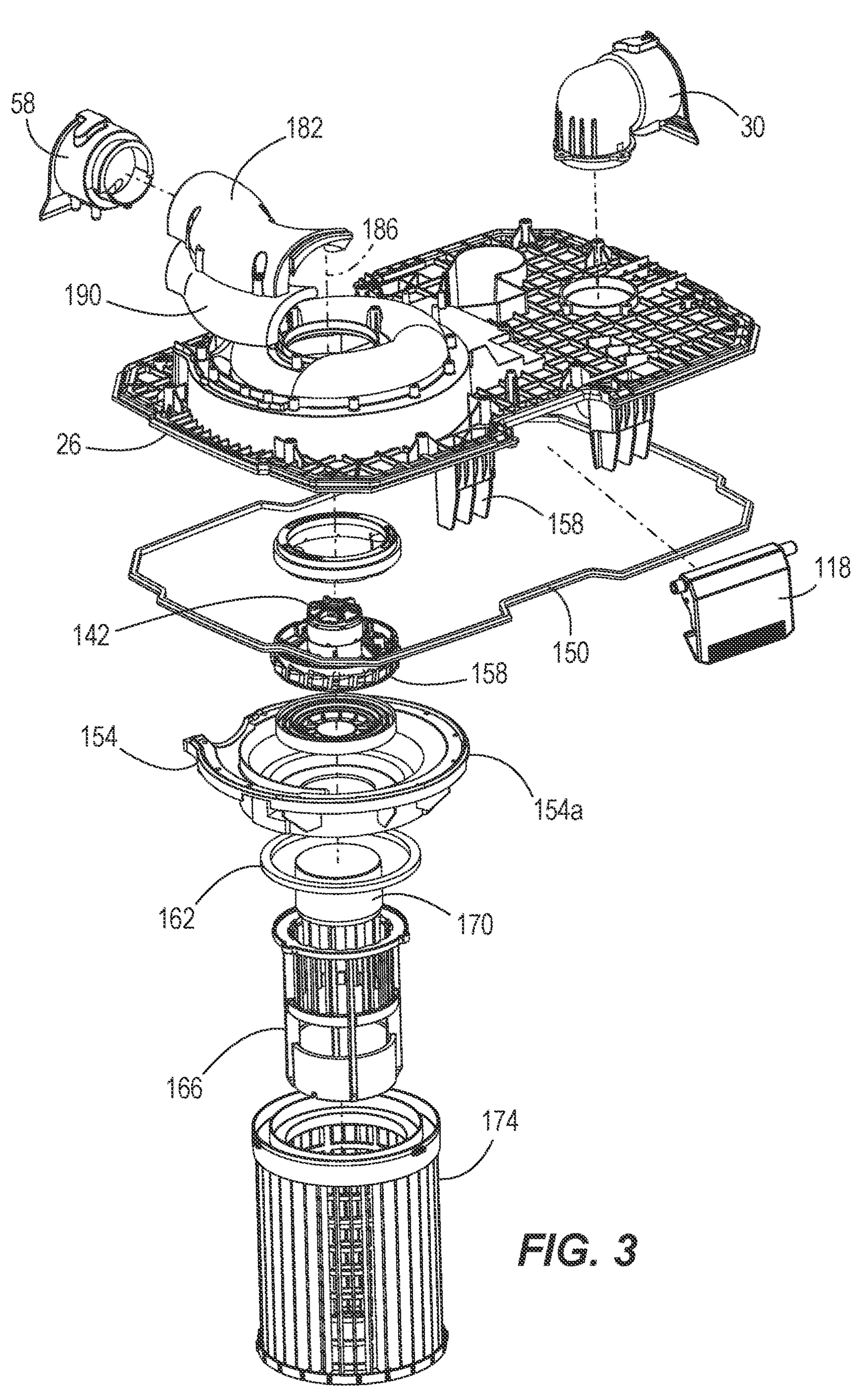
FIG. 3 is an exploded view of a midframe of the vacuum cleaner of FIG. 1A.

FIGS. 1A and 1B illustrate a vacuum cleaner 10 including a stand 14, a tank 18, a head 22, and a midframe 26 (as illustrated in FIG. 3) positioned between the tank 18 and the head 22. The vacuum cleaner 10 (e.g., the head) includes a hose inlet 30 through which debris and fluid (e.g., liquid and/or air) pass through during operation of the vacuum cleaner 10. As illustrated in FIG. 1, the tank 18 functions as a collector to gather debris (e.g., solid or liquid) sucked by the vacuum cleaner 10.

The stand 14 is mounted upon wheels 34 for moving the vacuum cleaner 10 assembly along a work surface S to different sites. The stand 14 further includes accessory retention features 38 configured to receive accessories 42 for storage and transport with the stand 14. The stand 14 further includes a foot pedal 46 opposite the accessory retention features 38. Other positions of the foot pedal 46, or other quantities of foot pedals 46 are possible. The user may operate the foot pedal 46 to attach or detach any tank 18 from the stand 14. Various sized tanks 18 may be provided (e.g., 6 gallons, 9 gallons, 12 gallons, etc.). Each tank 18 may be dimensioned to engage the stand 14. The foot pedal 46 may be biased to an engaged position in which one tank 18 is secured to a corresponding stand 14. Similarly, different vacuum cleaners 10 may be arranged with differing heads 22 connected to any of the tanks 18. The user provide motive force to the vacuum cleaner 10 to translate the vacuum cleaner 10 along the work surface S by the wheels 34 between work sites (e.g., piles of debris, containers having fluid). The wheels 34 may be lockable once in a desired work site to inhibit movement of the vacuum cleaner 10 from the work site. The wheels 34 may be freely swiveling caster wheels or other non-swiveling rotating wheels.

With continued reference to FIGS. 1A and 1B, the tank 18 includes a drain cap 50 which may be removed from the tank 18 to remove (e.g., drain) debris (e.g., solid, granular, and/or fluid debris) from the tank 18. As will be discussed below, in some embodiments, the tank 18 may receive a portion of the midframe 26. A buckle 118 may selectively couple the head 22 to the tank 18. The head 22 may be removable from the tank 18 upon release of the buckle 118 to permit access into the interior of the tank 18. The head 22 may include a handle 54. The handle 54 is coupled to the head 22 to permit removal of the head 22 from the tank 18 when the buckle 118 is released. The handle 54 may be operable to carry both the head 22 and the tank 18 when the buckle 118 secures the head 22 to the tank 18. The tank 18 may also be removably coupled to the stand 14 (e.g., by the foot pedal 46) to permit maneuvering of the tank 18, head 22, and midframe 26 to various work sites without requiring the stand 14.

Figures 4A, 4B:
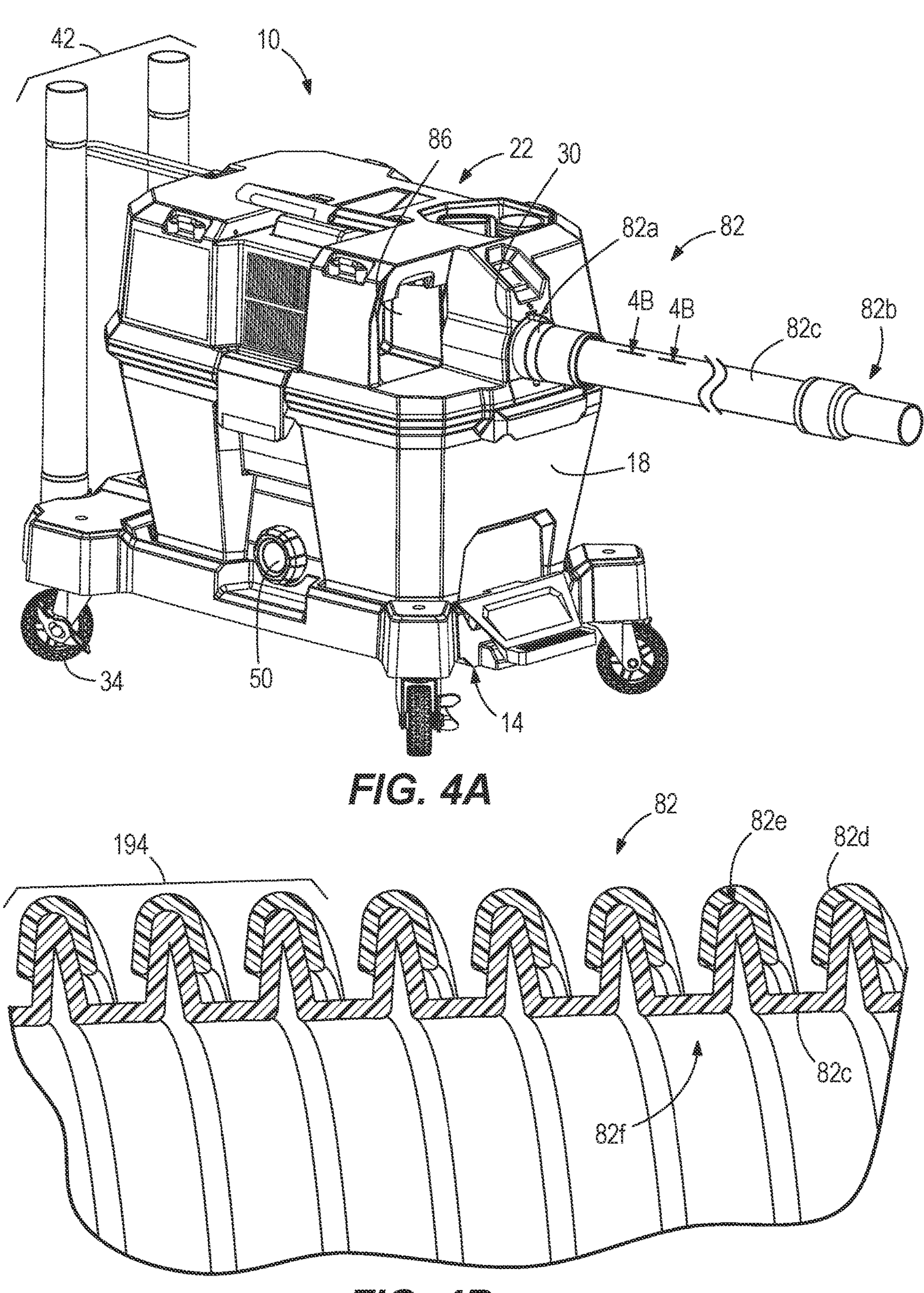
FIG. 4A is a perspective view of the vacuum cleaner of FIG. 1A coupled to a hose.
FIG. 4B is a cross-sectional view of the hose of FIG. 4A taken along section line 4B-4B in FIG. 4A.

With continued reference to FIGS. 1A and 1B, the head 22 includes a blower port 58 which functions as an exhaust to pass clean air that has entered the vacuum cleaner 10 (e.g., through the head 22) via the hose inlet 30 back to the surroundings of the vacuum cleaner 10. The illustrated blower port 58 is positioned on a sidewall 62 of the tank 18. However, the blower port 58 may be otherwise positioned. The head 22 further includes an accessory mounting cleat 66, a hose wrap clip 70, a hose wrap bungee 74, and a hose wrap rest 78. These elements may engage accessories 42 and/or a hose 82 (as illustrated in FIG. 4A) during storage, transport, and/or use of the vacuum cleaner 10.

The head 22 further includes a battery box 86 configured to receive a power source 90 (e.g., a battery pack). In other embodiments, multiple battery boxes 86 may be provided. In some exemplary embodiments, the power source 90 may be, for example, an 18 Volt battery pack. In some other exemplary embodiments, the power source 90 may be, for example, two 18 Volt battery packs, each configured to be received by a corresponding battery box 86. In some other exemplary embodiments, the power source 90 may be, for example a single 36 Volt battery pack. In other embodiments, the power source 90 may include a total voltage of greater than 36 volts (e.g., 72 Volts, 80 Volts or more). Other power sources are possible. The vacuum cleaner of FIGS. 6A-7B, described in detail below, is also configured to receive power from an alternating current (AC) (e.g., 110-120 VAC, 220-240 VAC) power source 90.

The head 22 further optionally includes a handle 54. The illustrated handle 54 is pivotable relative to the head 22. The handle 54 is configured to extend (e.g., project) from the head 22 when a user grasps the handle 54, and the handle 54 is retained within a recess 94 in a top surface 98 of the head 22 when the user releases the handle 54. The top surface 98 may then be free to be secured to another tool or storage mechanism (not shown) by the accessory mounting cleat 66.

The head 22 further includes a power switch 102 configured to selectively operate (e.g., turn on and turn off) the vacuum cleaner 10. The power switch 102 may be configured to operate the vacuum cleaner 10 at different operating speeds (e.g., a high speed, a low speed), resulting in different volumetric fluid flow into the vacuum cleaner 10.

Figure 2:
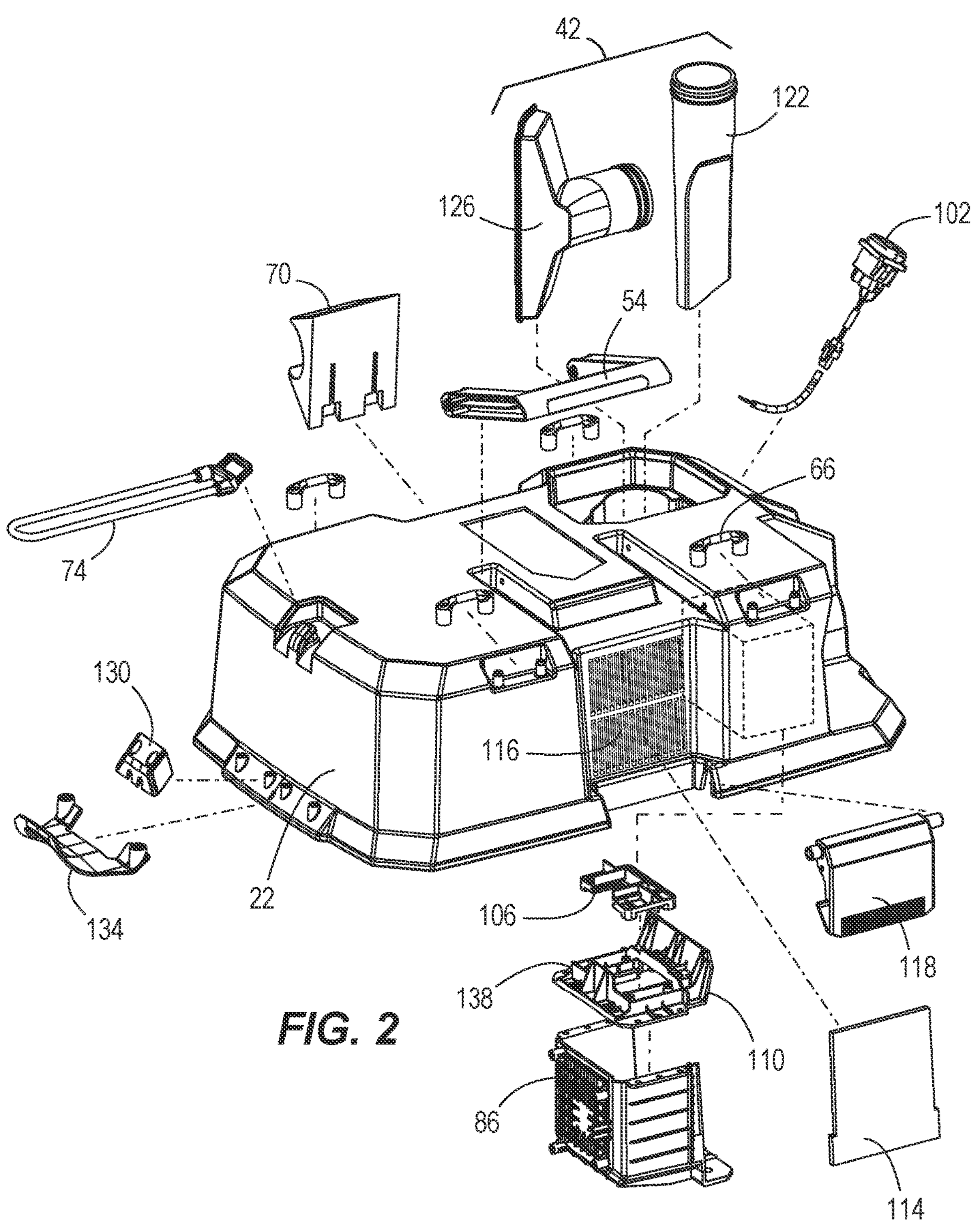
FIG. 2 is an exploded view of a head of the vacuum cleaner of FIG. 1A.

FIG. 2 illustrates an exploded view of the head 22. Adjacent the battery box 86, battery terminals 106, battery rails 110, and battery box foam 114 are provided. The battery rails 110 are dimensioned to guide batteries into engagement with the battery box 86. The battery terminals 106 are configured to electrically couple the battery (e.g., power source 90) to a motor-impeller assembly 142 once the battery (e.g., power source 90) is fully seated in the battery box 86. Buckles 118 are provided, and may work in conjunction with the handle 54 to selectively secure the head 22 to the tank 18. FIG. 2 further illustrates a crevice tool 122 and a floor tool 126 which are each exemplary accessories 42 configured for use with the vacuum cleaner 10. The hose wrap rest 78 may include a hose rest support 130 and a hose rest 134. The hose rest support 130 may engage the head 22, and support the hose rest 134. The hose 82 may rest upon the hose rest 134.

The head 22 further includes a plurality of exhaust slits 116 which provide fluid communication between the internal volume of the head 22 and the surroundings of the vacuum cleaner 10. The exhaust slits 116 are distinct from the blower port 58. The battery box foam 114 is positioned on the exhaust slits 116 adjacent to the battery box 86. The battery box foam 114 has anti-static material properties. The battery box foam 114 may be made of a polyurethane foam having a positive charge affinity. The battery box foam 114 is air-permeable such that any pressurized fluid (e.g., air) within the head 22 may pass through the battery box foam 114 prior to being exhausted to the surroundings of the vacuum cleaner 10 via the battery box foam 114 and the exhaust slits 116. The battery box foam 114 may mitigate sound generated by the vacuum cleaner 10, and mitigate static discharge generation of the vacuum cleaner 10.

The vacuum cleaner 10 further includes a controller and printed circuit board assembly (PCBA) 138 electrically coupled to the battery terminals 106, the power switch 102, and the motor-impeller assembly 142. The PCBA 138 operate the motor-impeller assembly 142 (in either a vacuum mode or a blower mode) when the power switch 102 is moved to or in an "on" position. The PCBA 138 may facilitate at least one of signal and/or power transfer between the power source 90 and the motor-impeller assembly 142. During operation, the power source 90 is configured to supply power to the motor-impeller assembly 142, and the motor-impeller assembly 142 is configured to generate fluid flow through the vacuum cleaner 10.

At least one component of the head 22 may comprise a static discharge mitigating material. For example, the buckles 118, crevice tool 122, floor tool 126, hose wrap clip 70, hose rest 134, and hose rest support 130 may comprise polypropylene. The head 22, handle 54, and battery box 86 may be made in part by polypropylene and talc. In some embodiments, the head 22 may comprise polypropylene and approximately 30% talc, talc compound, or talc additive. The battery box foam 114 may comprise polyurethane. The battery terminals 106 and battery rails 110 may comprise acrylonitrile butadiene styrene (ABS) and/or polycarbonate (PC). The hose wrap bungee 74 may include a rubber core and a polyester yarn jacket. The accessory mounting cleats 66 and/or volute 154 may comprise Polyamide 6, Nylon 6 or polycaprolactam (PA6) and approximately 30% glass fill (GF). One of ordinary skill in the art would appreciate that these material selections, combinations, and relative amounts of combination (e.g., 30%) may be varied to achieve desired outcomes. In the present embodiment, the material selection for these components maximizes power transfer from the power source 90 to the motor-impeller assembly 142 and volumetric flow rate generated by the motor-impeller assembly 142 while mitigating the generation and discharge of static electricity from the vacuum cleaner 10 to a user and/or from certain components (e.g., the hose 82) of the vacuum cleaner 10 to other components (e.g., the PCBA 138, motor-impeller assembly 142) of the vacuum cleaner 10. Generation and discharge of static electricity is discussed in detail below.

FIG. 3 illustrates the midframe 26 of the vacuum cleaner 10 illustrated in FIGS. 1A and 1B. As previously recited, the midframe 26 is positioned between the tank 18 and the head 22. The midframe 26 may be coupled to the head 22 such that when the head 22 is removed from the tank 18, the midframe 26 is removed from the tank 18 with the head 22. The midframe 26 may include a midframe seal 150 surrounding the periphery of the midframe 26 and positioned between the midframe 26 and the tank 18. Generally speaking, the midframe 26 and The midframe seal 150 separate the interior of the tank 18 from the interior of the head 22. The midframe 26 includes a motor-impeller assembly 142 configured to generate vacuum pressure and/or a blowing pressure. The motor-impeller assembly 142 is supported by the midframe 26. The vacuum pressure generated by the motor-impeller assembly sucks debris (e.g., solid, granular, and/or fluid debris) through the hose inlet 30. The blowing pressure generated by the motor blows fluid (e.g., air) through a blower port 58. A volute 154 is provided around the motor-impeller assembly 142. In other words, the volute 154 surrounds at least a portion fo the motor-impeller assembly 142. A lower motor isolator 158 is positioned between the motor-impeller assembly 142 and the volute 154. The motor isolator 158 comprises a material (e.g., EPDM) having electrically insulative properties. Other materials (e.g., glass, plastic, rubber, ceramics) may also be used. However, rubbers may provide necessary vibration damping. The volute 154 may comprise an anti-static material configured to isolate static charge of the volute 154 from the motor-impeller assembly 142. The volute 154 may include an overmolded portion 154*a*. The overmolded portion 154*a* may have different material (e.g., surface resistance) properties as the remainder of the volute 154. A filter seal 162 may be provided adjacent the volute 154 and opposite the motor-impeller assembly 142. A ball cage 166 may be positioned against the filter seal 162, and receive a ball float 170 therein. When the tank 18 is filled with debris and/or fluid, the ball float 170 may rise to abut the volute 154 and block further suction. In some embodiments, the ball float 170 may rise to abut the volute 154 and trigger an auto-shutoff of the motor-impeller assembly 142. A filter 174 surrounds the ball cage 166. Opposite the lower motor isolator 158, the motor-impeller assembly 142 engages an upper motor isolator 178. The upper motor isolator 178 separates the motor-impeller assembly 142 from the midframe 26. The upper motor isolator may be made of a similar electrically insulative material (e.g., EPDM, any other rubber, ceramic, glass, or plastic) as the lower motor-isolator 158. An exhaust tube 182 may be positioned downstream of the motor-impeller assembly 142 between the motor-impeller assembly 142 to connect the motor-impeller assembly 142 with the blower port 58 (i.e., an "outlet"). In other words, the exhaust tube 182 is in fluid communication with and between the motor-impeller assembly 142 and the blower port 58. The exhaust tube 182 comprises an anti-static material. In the illustrated embodiment, the exhaust tube 182 is comprises a polypropylene material with a high surface resistivity of between 1.00E+15 to 1.00E+17. An inner surface 186 of the exhaust tube 182 (i.e., "exhaust") may be provided with exhaust foam 190. The exhaust foam 190 may comprise polyurethane foam (or any other anti-static material, any other anti-static foam), and may assist in reduction of sound generated by the vacuum cleaner 10.

FIG. 3 illustrates, in parentheses adjacent the above-described components of the midframe, an exemplary material selection for the components of the midframe. In some embodiments, the blower port 58, exhaust tube 182, ball float 170, and buckles 118 may comprise polypropylene. The filter 174 may comprise polypropylene, acrylonitrile butadiene styrene, and/or polytetrafluoroethylene. The overmolded portion 154*a* of the volute 154 may comprise thermoplastic polyurethane. The lower motor isolator 158, the upper motor isolator 178, and the midframe seal 150 may comprise ethylene propylene diene monomer rubber. The filter seal 162 may comprise ethylene propylene diene monomer foam. The exhaust foam 190 may comprise polyurethane. The midframe 26 may comprise polypropylene and approximately 30% talc, talc compound, or talc additive. The volute may comprise Polyamide 6, Nylon 6 or polycaprolactam (PA6) and approximately 30% glass fill (GF).

FIGS. 4A and 4B illustrate the vacuum cleaner 10 coupled with a hose 82 at the hose inlet 30 of the vacuum cleaner 10. The hose 82 includes two hose ends 82*a*, 82*b* and a hose body 82*c*. A proximal hose end 82*a* is configured to be coupled to either the hose inlet 30 or the blower port 58 of the vacuum cleaner 10 and the hose body 82*c*. A distal hose end 82*b* is positioned on an opposite longitudinal end of the hose body 82*c* as the proximal hose end 82*a* (e.g., the distal hose end 82*b* is spaced form the proximal hose end 82*a*). The distal hose end 82*b* functions as a first point of contact inlet to the vacuum cleaner 10. The hose body 82*c* is mechanically coupled to the proximal hose end 82*a* and the distal hose end 82*b*. The hose body 82*c* has an inner surface through which fluid flow generated by the motor-impeller assembly 142 passes, and an outer surface open to the surroundings of the hose 82. While the vacuum cleaner 10 is operated to vacuum debris and/or fluid, the inlet debris and/or fluid contacts the distal hose end 82*b*, the hose body 82*c*, and the hose inlet 30 during entry into the vacuum cleaner 10. Additionally or alternatively, the distal hose end 82*b* may be attached to an one or more accessories 42, and the accessories 42 may be positioned upstream of the distal hose end 82*b* to function as an inlet and first point of contact to the vacuum cleaner 10.

At least one component of the midframe 26 as annotated in FIG. 3 may comprise a static discharge mitigating material. The tank 18 may comprise polypropylene and approximately 30% glass fill (GF) as well as an anti-static additive. In other embodiments, the glass fill amount (e.g., percentage) of the tank 18 may differ (e.g., may be between 20% and 40%). The hose inlet 30 may comprise polypropylene and an anti-static additive. Alternatively, the hose inlet 30 may comprise polypropylene and approximately 20% glass fill (GF), and optionally as an anti-static additive. In other embodiments, the glass fill amount (e.g., percentage) of the hose inlet 30 may differ (e.g., may be between 10% glass fill and 30% glass fill). The hose ends 82*a*, 82*b* may comprise polypropylene and an anti-static additive. At least one of the hose ends 82*a*, 82*b* may comprise an anti-static material with a negative charge affinity (such as but not limited to polypropylene and/or polypropylene in combination with another anti-static material). The hose 82 may comprise at least one layer 82*d* of carbon black. The layer 82*d* may be made of any anti-static material, and may be applied to either the inner surface of the hose body 82*c* or an outer surface 82*e* of the hose body 82*c*. In some embodiments, the hose 82 may comprise two or more layers 82*d* of carbon black. As illustrated, the hose body 82*c* may comprise carbon black, and the hose 82 may further include an overmolded layer 82*d* including carbon black onto the outer surface 82*e* of the hose 82. In other embodiments, the hose body 82*c* and the layer 82*d* may have different material (e.g., surface resistance, volume resistivity) properties. For example, the hose body 82*c* and the layer 82*d* may have different chemistries altogether. Alternatively, the hose body 82*c* and the layer 82*d* may have differing concentrations of carbon black and other materials. The hose 82 may be a corrugated, and include a plurality of corrugations 194 along the length thereof. The overmolded carbon black 82*d* may be positioned on an outer surface of at least one of the corrugations 194, and optionally axially between adjacent corrugations 194 of the hose 82. Exemplary anti-static additives are listed in detail below.

The vacuum cleaner 10 may be configured for use in a vacuum mode wherein the proximal end 82*a* of the hose 82 is connected to the hose inlet 30, and the motor-impeller assembly 142 is configured to pass dirty fluid with debris passes into the tank 18. The filter 174 separates the working fluid (e.g., air) from the debris (e.g., solid debris and/or vacuum fluid [e.g., water, other liquids]). The vacuum cleaner 10 may also be configured for use in a blower mode wherein the proximal end 82*a* of the hose 82 is connected to the blower port 58. In this blower mode, the motor-impeller assembly 142 induces a blown fluid flow through the hose inlet 30 and out the blower port 58.

Upon operation of the motor-impeller assembly 142, debris (e.g., solid or fluid debris) and dirty air is sucked through the vacuum cleaner 10. With each contact between the debris and/or dirty air and the vacuum cleaner 10, a difference between a charge affinity of the vacuum cleaner 10 and the debris and/or dirty air will induce a static charge within the vacuum cleaner 10. The amount of charge created per unit energy associated with friction between two contacting insulators (such as between debris and the hose 82) can be estimated through a difference between the charge affinity of two contacting insulators. Charge affinity of various insulators have been experimentally quantified and are tabulated in triboelectric tables which are widely available.

A triboelectric table describes the charge affinity of many insulators to predict which material will become positively charged and which material will become negatively charged when the two materials contact one another (e.g., are pressed or rubbed together). A triboelectric table also predicts the strength of the effect of pressing or rubbing two different materials together. Materials that induce charge when rubbed together may include insulators, and may include air. Charge affinity is experimentally measured in nC/J, or nano-Coulombs of charge per Joule of energy associated with the pinching or friction between the two materials.

To obtain the expected amount of charge in each contacting insulator per unit energy of associated friction, a difference is taken between the charge affinity of the first insulator and the second insulator. Additionally, to determine which insulator will become positively charged, and which insulator will become negatively charged, a metal effect column is provided in a typical triboelectric table. A '+' sign or '−' sign indicates the polarity of the resulting charge for each insulator after pinching or frictional contact. The '+' sign corresponds with a positive charge and the '−' sign corresponds with a negative charge.

For example, when pine lumber sawdust (i.e., solid pine lumber debris) is vacuumed by the vacuum cleaner 10, sawdust having a charge affinity of −7 nC/J and a positive polarity contacting the accessory a charge affinity of −90 nC/J and a negative polarity results in, a difference between the two charge affinities of 97 nC/J. Thus, for every joule of energy the sawdust contacts the ABS portion of the filter 174, +97 nC of charge is retained in the sawdust. Additionally, −95 nC of charge is retained by the accessory. As illustrated in Table 1 below, the sawdust may impact any one or more of the accessories 42, the hose ends 82*a*, 82*b*, the hose 82, the hose inlet 30, the tank 18, each portion of the filter 174, the volute 154, the lower motor isolator 158, the midframe 26, and the blower port 58. The sawdust may also impact other components of the vacuum cleaner 10. These impacts further induce a static charge within the vacuum cleaner 10. Thus, in a vacuuming operation of pine lumber sawdust, a significant amount of static charge can be generated by the vacuum cleaner 10. When compared to lower operation speeds of the motor-impeller assembly 142, at higher operation speeds of the motor-impeller assembly 142, pine lumber sawdust may travel at higher speeds within the vacuum cleaner 10, resulting in higher energy and frictional force between the pine lumber sawdust and the components of the vacuum cleaner 10.

Table 1 below lists the charge affinities of some of the components of the vacuum cleaner 10 and corresponding charge affinities between contacting insulators. Table 1 also lists an induced charge between the two insulators per joule of contact force between the two insulators. The material properties of the vacuum cleaner components correspond with the charge affinities shown in Table 1. Table 1 further provides exemplary materials for each component of the vacuum cleaner, and lists known surface resistivities of materials used in various components of the vacuum cleaner. Materials of the vacuum cleaner components may be otherwise selected. It is possible that another material be substituted for pine lumber sawdust as a workpiece. Accordingly, the charge affinities corresponding to pine lumber sawdust, must be updated in Table 1 to perform a similar analysis with a work piece of a different material.

| First Insulator | | Second Insulator | | Difference Induced | | |
|---|---|---|---|---|---|---|
| Component | Charge Affinity [nC/J] | Component | Charge Affinity [nC/J] | Static Charge [nC/J] | Material | Surface Resistivity [Ω/Sq.] |
| Accessory (42) | −90 | Pine lumber sawdust (example work piece) | 7 | −97 | PP | 1.00E+16 |
| Hose End (Distal, 82b) | −90 | Sawdust | 7 | −97 | PP + Anti-Static | 2.24E+10 |
| Hose body (82c) | −90 | Sawdust | 7 | −97 | PP + Anti-Static | 1.00E+08 |
| Hose End (Proximal, 82a) | −90 | Sawdust | 7 | −97 | PP + Anti-Static | 2.24E+10 |
| Hose Inlet (30) | −90 | Sawdust | 7 | −97 | PP + 20% GF + Anti-Static | 10E9-10E10 |
| Tank (18) | −90 | Sawdust | 7 | −97 | PP + 20% GF + Anti-Static | 10E9-10E10 |
| Filter (ABS, 174) | −5 | Sawdust | 7 | −12 | ABS | Presently Unknown |
| Filter (PTFE, 174) | Presently Unknown | Sawdust | 7 | −97 | PTFE | Presently Unknown |
| Volute (154) | −90 | Sawdust | 7 | −97 | PA6 30% GF | 1.00E+14 |
| Motor Isolator (158/178) | −140 | Sawdust | 7 | −147 | EPDM | Presently Unknown |
| Midframe (26) | −90 | Sawdust | 7 | −97 | PP | 1.00E+16 |
| Blower Port (58) | −90 | Sawdust | 7 | −97 | PP | 1.00E+16 |

As evident from the data in Table 1, the vacuum cleaner 10 provides many possible locations for static charge to be induced between the vacuum cleaner 10 and the debris. Additionally, components of the vacuum cleaner 10 rub or otherwise contact each other, and thus can induce a static charge by contacting the contacting components of the vacuum cleaner 10.

The surface resistivities listed in Table 1 are exemplary surface resistivities only. In other embodiments, the hose body 82*c* may comprises a surface resistivity of between 1.00E+07 ohms per square and 1.00E+09 ohms per square. In other embodiments, at least one of the proximal hose end 82*a* and the distal hose end 82*c* may comprise a surface resistivity of between 1.00E+09 ohms per square and 1.00E+11 ohms per square. In other embodiments, the midframe 26, accessories 42, and/or blower port 58 may comprise a material having a surface resistivity between 1.00E+15 and 1.00E+17. In other embodiments, the volute 154 may comprise a material having a surface resistivity of between 1.00E+13 ohms per square and 1.00E+15 ohms per square.

Various other observations may be made with regard to the information provided in Table 1. For example, either of the motor isolators 158, 178 may be made of a material having a greater negative charge affinity when compared with the midframe 26. When considering each of the presented surface resistivities of the components of the vacuum cleaner 10, it becomes apparent that induced static charge is managed in such a way to inhibit discharge to the motor-impeller assembly 142, power source 90, PCBA 138, and the user.

One consideration of the current invention is to reduce the static charge generated by a large difference in charge affinity between the components of the vacuum cleaner 10 and debris that frequently contacts components of the vacuum cleaner 10 with a high amount energy. Thus, the amount of induced static charge within the vacuum cleaner 10 can be decreased and the intensity and frequency of static discharge to the user or the electronics of the vacuum cleaner can be mitigated.

Surface resistance is a measurement of current resistance of a material in a direction along a plane forming a sheet of the material. Surface conductivity is a measurement of current flow of a material in a direction along a plane forming a sheet of the material. Volume resistivity is a measurement of current resistance of a material in a direction perpendicular to a plane formed by a sheet of material. Volume conductivity is a measurement of current flow of a material in a direction perpendicular to a plane formed by a sheet of material.

In the embodiment of the vacuum cleaner 10 illustrated in FIGS. 4A and 4B, the surface resistance and volume resistivity of the hose ends 82*a*, 82*b*, the hose 82, and the hose inlet 30 of the anti-static additive used to form these components is lower than the surface resistance and volume resistivity of commonly used base injection molded plastics. As the surface resistance of the hose ends 82*a*, 82*b*, the hose 82, and the inlet are lower than the base material, static charge more freely flows through the hose ends 82*a*, 82*b*, the hose 82, and the hose inlet 30. In absence of the anti-static additive, static charge is likely to accumulate on the hose ends 82*a*, 82*b*, the hose 82, and the hose inlet 30. In contrast, with the dispersed anti-static additive, charge more freely flows through hose ends 82*a*, 82*b*, the hose 82, and the hose inlet 30 and typically, through the head 22, the midframe 26, tank 18, and stand 14 to the ground. Thus, by dispersing the additive at least the hose ends 82*a*, 82*b*, the hose 82, and the hose inlet 30, it is less likely that static charge will accumulate on the vacuum cleaner 10 and discharge through the user as an electrical shock or through the electronic components (e.g., the PCBA 138, power source 90, motor-impeller assembly 142, etc.) of the vacuum cleaner 10.

FIG. 4B illustrates the hose body 82*c* in detail. As mentioned above, the outer side 82*e* of the hose body 82*c* includes a layer 82*d* of carbon black. The layer 82*d* substantially encloses the outer side 82*e* of the hose 82. The layer 82*d* may comprise a different carbon black material than the hose body 82*c*. In other embodiments, the layer 82*d* may comprise a similar carbon black material when compared to the hose body 82*c*, but is simply overmolded onto the hose body 82*c*. In other embodiments, the layer 82*d* may comprise different base materials and/or additives which otherwise have different anti-static mechanical properties when compared to the hose body 82*c*. In the illustrated embodiment, the layer 82*d* may comprise carbon black. The hose body 82*c* may comprise a plastic (e.g., polypropylene or otherwise) inner layer. In some embodiments, another inner layer 82*f* of anti-static material may be applied to the inner surface of the hose body 82*c*. The inner layer 82*f* may include surface resistivity and/or volume resistivity mechanical properties configured to distribute static charge away from the distal hose end 82*b* of the vacuum cleaner 10, through the vacuum cleaner 10, and into the ground through the stand 14 or the tank 18. The inner layer 82*f* may be made of any material having surface resistance lower than a surface resistance of the material of the hose body 82*c*.

The volume resistance and surface resistance of the components of the vacuum cleaner 10 may be influenced by the addition of one or more anti-static additives added to commonly used injection molding plastics. Exemplary anti-static additives are listed below adjacent known surface resistance and volume resistivity of the additives. Any number of additives with any number of volume and surface resistances may be added to the components of the vacuum cleaner 10. Table 2 below provides a summary list of exemplary anti-static additives that may be relevant and useful in the design of power tools, and specifically vacuum cleaners 10, for the mitigation of static discharge. The columns of the Table 2 below provide the surface resistance and volume resistivity of two exemplary Anti-Static additive materials. Components including anti-static additives such as those listed in Table 2 include surface resistances which permit passage of charge through the components (i.e., dissipation of change away from said components) and to other components of the vacuum cleaner, or to the ground.

TABLE 2

List of Relevant Materials

| Additive/Trade Name | Surface Resistance [Ω] | Volume Resistivity [Ω · cm] |
|---|---|---|
| Anti-Static Additive 1 | 1E7-1E9 | 1E7-1E9 |
| Anti-Static Additive 2 | 1E9-1E10 | Unknown |

Surface resistivities of various components in the vacuum cleaner 10 are also listed above in Table 1. These listed surface resistivities are merely exemplary given the materials selected for the vacuum cleaner 10. In other words, different materials may have different surface resistivities, and the vacuum cleaner 10 may still exhibit anti-static properties. Generally speaking, the components with high surface resistivity will pass less static charge to other components of the vacuum cleaner 10 when compared to components with low surface resistivity. Materials have been selected such that static charge generated by contact between debris (e.g., the sawdust) and components of the vacuum cleaner 10 may pass static charge in a calculated manner to different components of the vacuum cleaner 10, and ultimately to the ground and/or surroundings as opposed to the electronic components (e.g., the PCBA 138, power source 90, motor-impeller assembly 142) of the vacuum cleaner 10 and/or the user.

Figure 5:
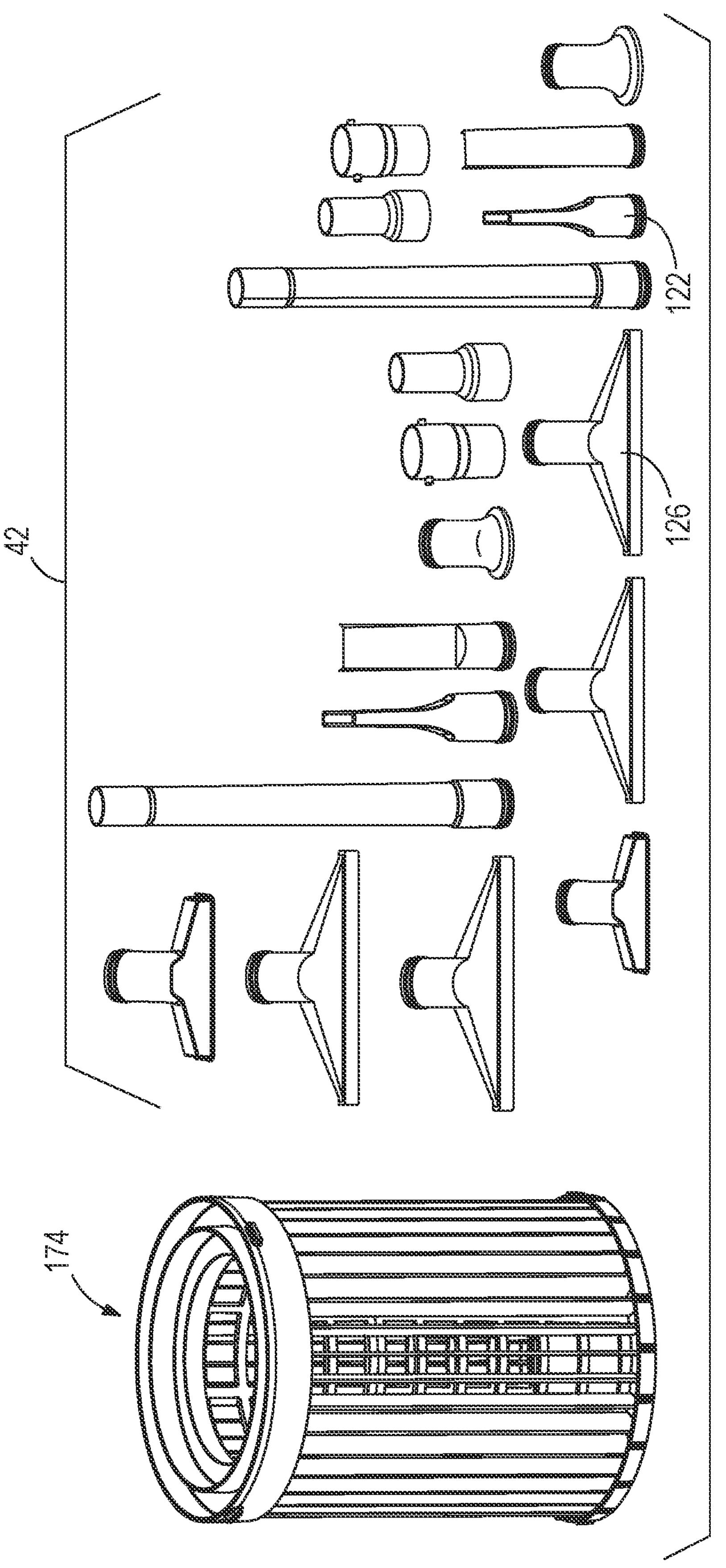
FIG. 5 is a perspective view of a plurality of different accessories configured for use with the vacuum cleaner of FIG. 1A.
Figure 6A:
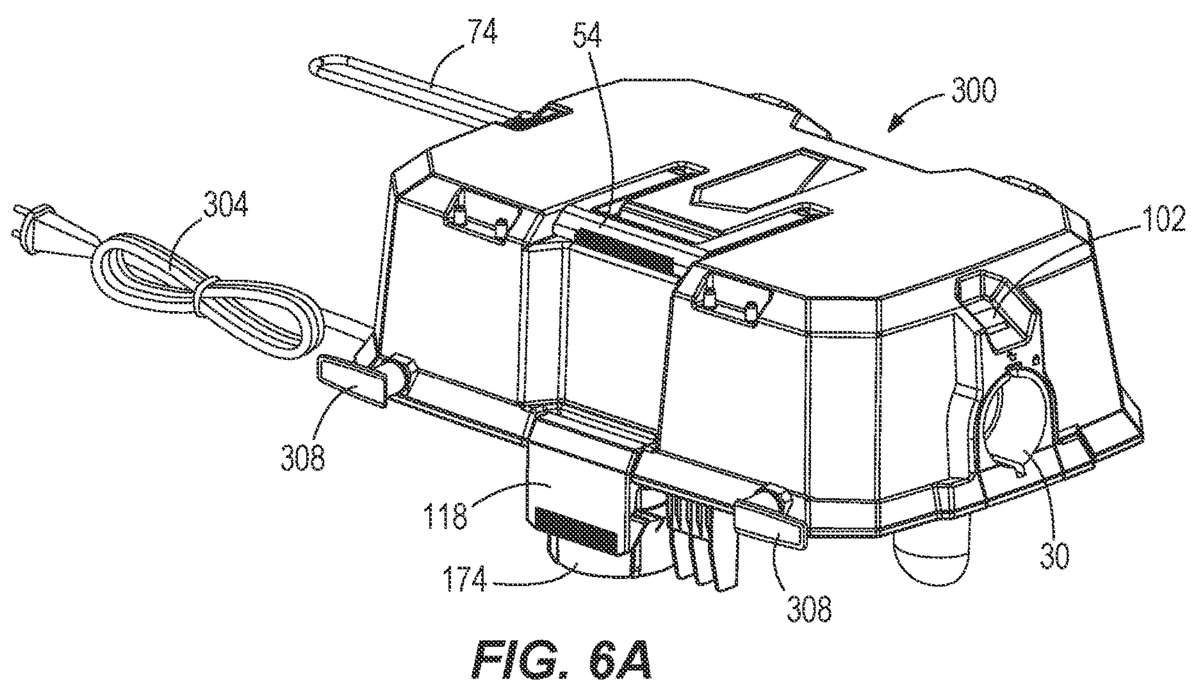
FIG. 6A is a perspective view of the head and midframe of the vacuum cleaner of FIG. 1A.
Figure 6B:
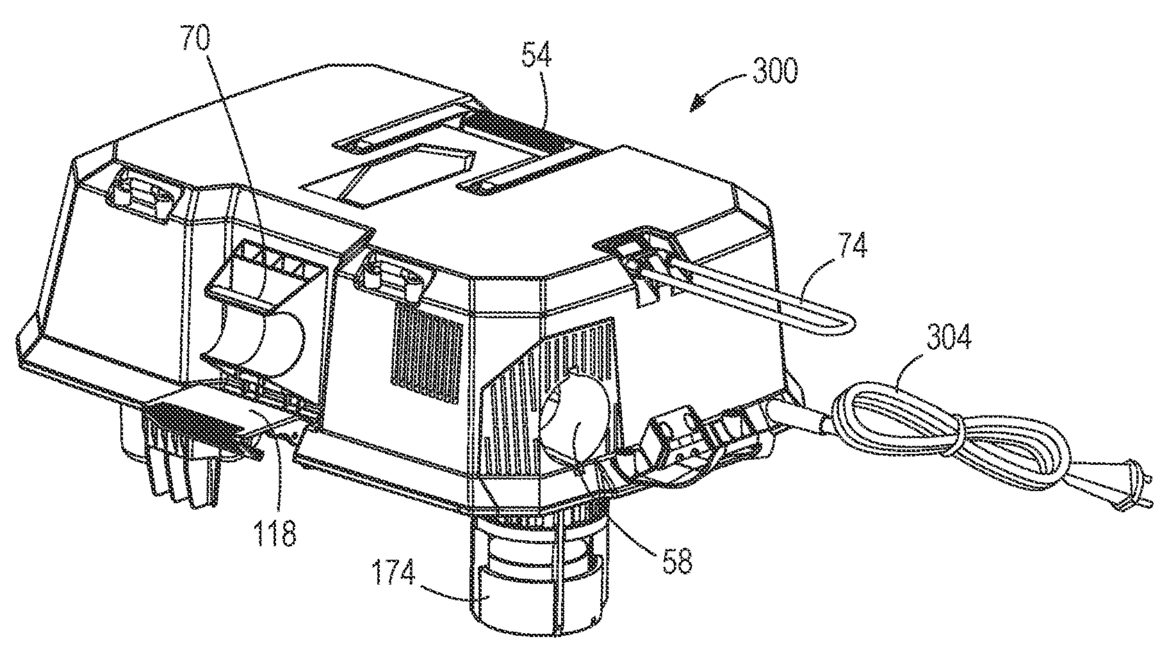
FIG. 6B is another perspective view of the head and midframe of FIG. 6A.
Figure 7A:
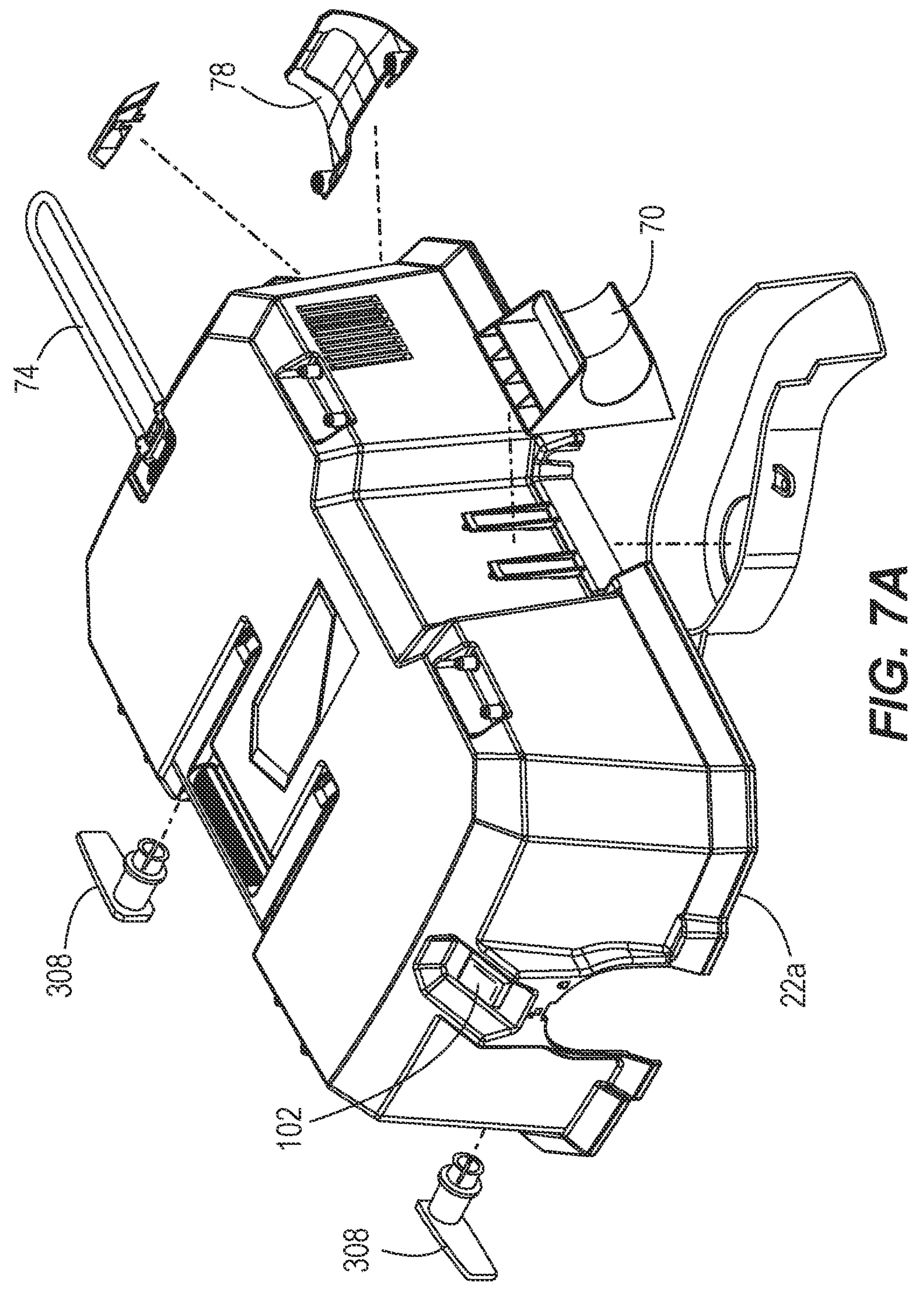
FIG. 7A is another exploded view of the head of FIG. 2.
Figure 7B:
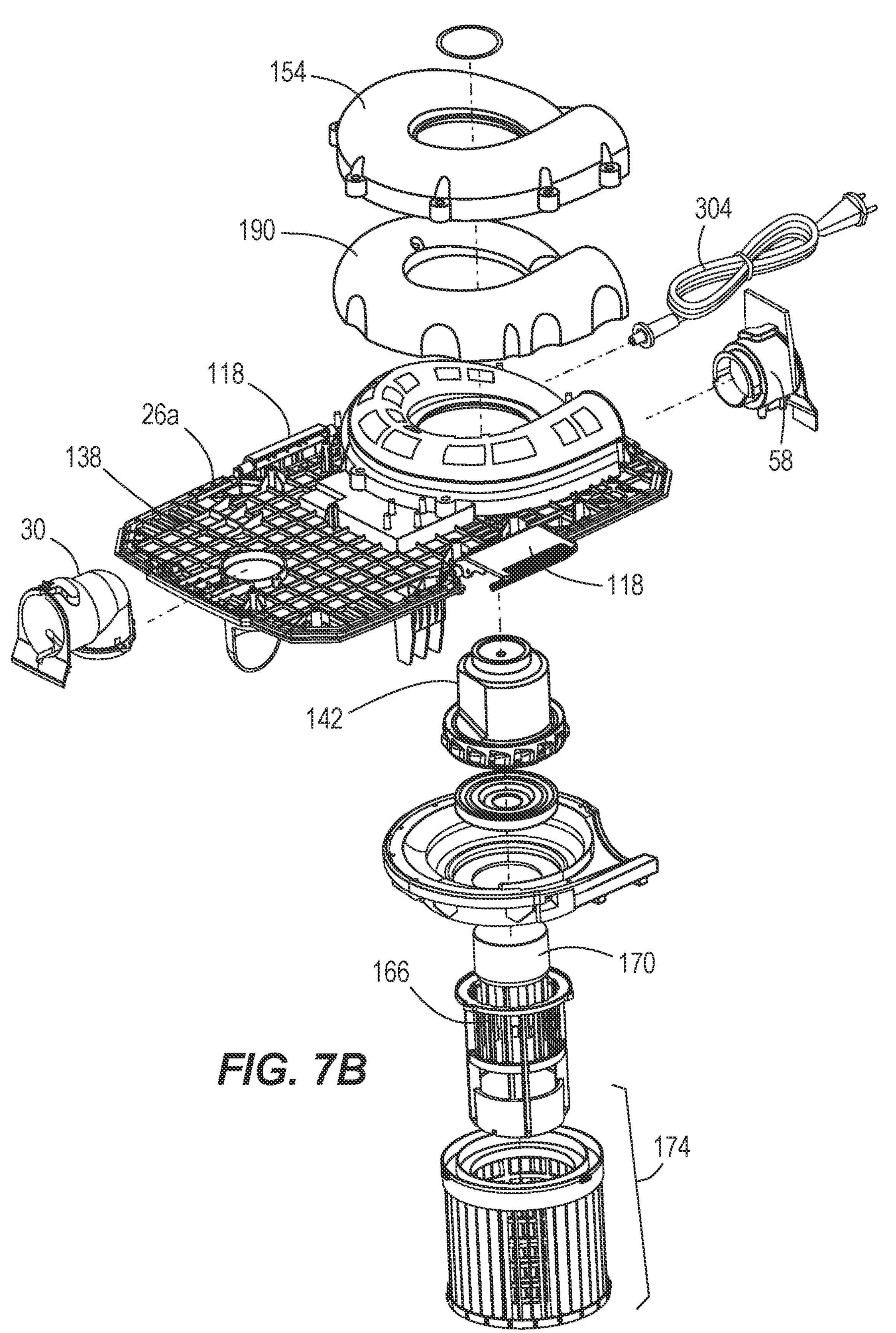
FIG. 7B is another exploded view of the midframe of FIG. 3.

FIG. 5 illustrates the filter 174. The filter 174 may be one of an E11-97% efficient filter, a HEPA 99.97% efficient filter, a H13-98% efficient filter, or a wet filter. Filters 174 may be attached and removed from the ball cage 166 according to desired use (e.g., acting as a blower, vacuuming certain types of debris or fluid) of the vacuum cleaner 10. FIG. 5 further illustrates a plurality of accessories 42 which may engage the hose 82 according to desired use (e.g., vacuuming certain types of debris or fluid, reaching certain work sites, etc.) of the vacuum cleaner 10. The accessories 42 are sized to engage the hose ends 82*a*, 82*b* of the hose 82. The accessories 42 are also sized to engage the accessory retention features 38 for storage and/or transport. The accessories 42 may comprise polypropylene. Other accessories 42 may comprise any other type of plastic, or any other material having excellent anti-static mechanical properties (e.g., surface resistance, volume resistivity). Some exemplary accessories 42 may comprise plastic as a base material, and an anti-static additive material. Other accessories 42 may comprise materials other than plastic which comprise anti-static material properties (e.g., surface resistivity, volume resistivity, etc.).

FIGS. 6A-7B illustrate another exemplary head 22*a* and midframe 26*a*. Like components found in the vacuum cleaner 10 of FIGS. 1-5 may also be found in the vacuum cleaner 300 of FIGS. 6A-7B. In the embodiment of FIGS. 6A-7B, the power source 90 may be an AC power source, and an AC cord 304 may couple the AC power source 90 to the vacuum cleaner 10. This vacuum cleaner 10 may include a rotating cord wrap 308 onto which the AC cord 304 can be wrapped during transport and/or storage of the vacuum cleaner 10. Selection of materials of the components of the vacuum cleaner 10 of FIGS. 6A-7B may generally align with the selection of materials of the components of the vacuum cleaner 10 of FIGS. 1A-5. Accordingly, the vacuum cleaner 10 of FIGS. 6A-7B may benefit from similar anti-static advantages as the vacuum cleaner of FIGS. 1A-5.

Various features of the invention are set forth in the following claims.

What is claimed is:

1. A vacuum cleaner system comprising:

a motor-impeller assembly configured to generate fluid flow, the fluid flow passing through a hose inlet;

a power source configured to supply power to the motor-impeller assembly; and a hose including a proximal hose end configured to be coupled to the hose inlet, a distal hose end spaced from the proximal hose end, a hose body coupled to the proximal hose end and the distal hose end, the hose body having an inner layer with an inner surface through which the fluid flow passes and an outer layer with an outer surface open to the surroundings of the hose, and anti-static material at least partially forming at least one of the inner layer and the outer layer, the anti-static material, the anti-static material being applied to either the inner surface of the hose body or the outer surface of the hose body, wherein the inner layer is adapted to inhibit static charge build-up on the hose body by inhibiting static charge generation due to contact and to thereby promote retention of static charge on dirt particles carried in the fluid flow;

wherein the inner layer has an inner layer surface resistance lower than an outer layer surface resistance of the outer layer; and wherein at least one of the inner layer and the outer layer comprises an injection molded plastic and an anti-static additive.

2. The system of claim 1, wherein the layer of anti-static material is over-molded onto the outer surface of the hose body.

3. The system of claim 1, wherein at least one of the proximal hose end and the distal hose end comprise an anti-static material with a negative charge affinity.

4. The system of claim 1, wherein the hose inlet comprises an anti-static material with a negative charge affinity.

5. The system of claim 1, wherein the hose body comprises a surface resistivity of between 1.00E+07 ohms per square and 1.00E+09 ohms per square.

6. The system of claim 1, wherein at least one of the proximal hose end and the distal hose end comprises a surface resistivity of between 1.00E+09 ohms per square and 1.00E+11 ohms per square.

7. The system of claim 6, wherein the at least one of the proximal hose end and the distal end comprises polypropylene and an anti-static additive.

8. The system of claim 1, wherein the hose inlet comprises polypropylene and a glass fill.

* * * * *